US012796850B2

(12) United States Patent
Aldabbous et al.

(10) Patent No.: US 12,796,850 B2
(45) Date of Patent: Nov. 17, 2026

(54) SYSTEM AND METHOD FOR PARCEL BOX WITH AN ADVANCED CHECKOUT SYSTEM, PARCEL QUALITY CHECK AND VIRTUAL CASH ON DELIVERY

(71) Applicants: Ahmad Meshari Aldabbous, Kuwait (KW); Hamad Meshari Aldabbous, Kuwait (KW)

(72) Inventors: Ahmad Meshari Aldabbous, Kuwait (KW); Hamad Meshari Aldabbous, Kuwait (KW); Mohammad Salah Alrefaei, Kuwait (KW)

(73) Assignees: Ahmad Meshari Aldabbous (KW); Hamad Meshari Aldabbous (KW)

( * ) Notice: Subject to any disclaimer, the term of this patent is extended or adjusted under 35 U.S.C. 154(b) by 262 days.

(21) Appl. No.: 18/168,593

(22) Filed: Feb. 14, 2023

(65) Prior Publication Data

US 2024/0268591 A1 Aug. 15, 2024

(51) Int. Cl.
*A47G 29/14* (2006.01)
*A47G 29/20* (2006.01)
*G06Q 20/06* (2012.01)

(52) U.S. Cl.
CPC ........... *A47G 29/141* (2013.01); *A47G 29/20* (2013.01); *G06Q 20/065* (2013.01); *A47G 2029/146* (2013.01); *A47G 2029/149* (2013.01)

(58) Field of Classification Search
None
See application file for complete search history.

(56) References Cited

U.S. PATENT DOCUMENTS

2004/0032330 A1* 2/2004 Hoffman ............. G07F 17/0092 340/5.2
2006/0192001 A1* 8/2006 Shaffer ................ G06Q 10/087 235/382
2006/0266826 A1* 11/2006 Banfield ............ G06Q 30/0217 705/14.1
2015/0120601 A1* 4/2015 Fee .................... G06Q 10/0836 705/339
2018/0286185 A1* 10/2018 Humphrys ............. G07G 1/009
2020/0372496 A1* 11/2020 Hochberg .......... G06Q 20/3674

* cited by examiner

*Primary Examiner* — John F Mortell
(74) *Attorney, Agent, or Firm* — Joseph A. Andelin; Fish IP Law, LLP

(57) ABSTRACT

System and method for achieving automated deliveries, parcel evaluation, employing a payment procedure on delivery and an advanced checkout system. An adjustable smart parcel box (PB) configured to drive upwards or downwards on a solid structure, comprises a unique identifying number (UID) to associate the PB with an address and additional data, such that users may place orders using the UID alone as the delivery information. The smart PB is employed with geofencing technology and comprises a storage compartment with a locking mechanism, a GPS locator sending GPS coordinates in real-time, communication module(s) communicating with other parcel box(es) independently and remote device(s), an access unit including a weatherproof shutter door and a scanner, virtual cash on delivery module including a QR payment method, light indicator, laser indicator and Product Quality Check system using smart algorithms, artificial intelligence, and sensory data.

8 Claims, 12 Drawing Sheets

SYSTEM AND METHOD FOR PARCEL BOX WITH AN ADVANCED CHECKOUT SYSTEM, PARCEL QUALITY CHECK AND VIRTUAL CASH ON DELIVERY

TECHNICAL FIELD

The present invention relates to systems and methods for managing and monitoring the complete logistic process of e-commerce purchases to be automated. More particularly, the disclosure relates to an advanced checkout system and method for e-commerce websites or any online platform and a smart parcel box system for securing delivered packages ordered from e-commerce websites or any online platform.

BACKGROUND

The standard purchase and delivery process based on online checkouts and residential addresses is time consuming, imprecise, unassured for, and requires trust. Orders made online require consumers to fill in an address and contact page with an address and at least one phone number, and as such, the task is time consuming and impractical in terms of repetition. In addition, entered addresses can be imprecise as the task of manual input gives a rise to an increase in errors which leads to delivering to wrong residents, taking longer routes and interrupted deliveries, such errors occur when the residential address is miswritten in a way and when the delivery is made by difficulty following street signs based on the residential address provided.

Moreover, deliveries requiring attendance of a recipient, do not only effect delivery time, but also, the environment. It is common for couriers to wait in the car for a recipient to attend and collect the package, which consequently makes the wait a waste of delivery time while unnecessarily emitting carbon dioxide as the car engine is kept turned on burning fuel by the halt. Therefore, for multiple deliveries, the time wasted on the wait and CO2 emissions add up to affect the delivery time and environment. Also, in some cases, the halt may increase and become unnecessary when the recipient cannot be reached, and the delivery returns for a second delivery attempt at another time.

In addition, time management in the pickup process is yet to be considered for an optimized logistic process since picking up the order from the point of preparation, such as a restaurant, is also part of the process. It is common that the courier is requested to pick-up before the time the order becomes ready, therefore making the courier wait and causing unnecessary crowd in public places.

Thus, time is wasted on several situations, those include filling delivery information, delivering to the wrong address, taking longer routes, missed deliveries, contacting the customer, waiting in the pickup process for the orders and in the delivery process for a paying recipient to attend the delivery and exchange cash.

Other problems arise when the quality of the delivered package is not checked. The troubled situation of tampering with the package and rough handling can be done by the courier when unmonitored or unevaluated. Such a situation cannot be held against the courier if a customer wanted to take an action and complain, since the courier may claim irresponsibility. And so, the satisfaction of the customer, courier, and sender stems from uncertain trust, as the success of the delivery depends entirely on unmonitored actions and spoken words.

Another occurring problem in online purchasing and home deliveries is the payment assurance. It is common that the customer does not trust to pay before receiving the package, for that reason, cash on delivery service is provided as a solution for e-commerce purchases. However, it is not the optimal solution since trust and contact between two strangers is a requirement for the payment to be made. The courier is required to contact the customer and wait for a paying recipient to attend the delivery and exchange cash, which consequently affects the delivery time. Also, in some cases, the recipient may receive the package and fail to pay, which leaves the courier in a difficult situation.

Solutions for unattended deliveries were developed in prior arts by having secure parcel boxes accept parcels, for couriers to successfully attempt unattended deliveries and recipients to collect delivered packages at any convenient time. The solutions reduced contact between couriers and customers since the parcel is delivered to a receiving compartment, which reduces delivery time. However, contact is yet to be completely eliminated since usually communication is still required to unlock the parcel box and the delivery process still depends on the unmonitored actions of the courier in the delivery vehicle and the uncertain claims of the recipient after receiving the parcel. Some prior arts disclosed a system with a camera to record the courier placing the package inside a receiving compartment, and monitor the parcel placed inside by pictures and video recording. However, checking the quality of the package itself is yet to be achieved. In addition, limited considerations regarding users' convenience are found in the parcel box solutions disclosed in prior arts, as neither do they consider users of all conditions, such as users with physical limitations and disabilities, nor do most take account of the loading/unloading process. Except, a solution was found accounting for the process of loading and unloading by including a hand cart that can be pulled out of the storage compartment of a parcel box. Nonetheless, the solution requires the user to have the physical ability to bow down in order to pull out the hand cart out of the grounded parcel box to facilitate the loading and unloading process, which can be a physical limit for particular users.

Moreover, the parcel boxes found in prior arts facilitate unattended deliveries without considering the payment process. It is common for users to select cash on delivery as the payment method due to trust issues, mentioned previously. Therefore, parcel box deliveries requiring cash on delivery must be evidently attended, which can disregard the main purpose of the parcel box when such payment methods are not considered.

In addition, the integration of the purchasing process with the delivery to optimize the complete logistic cycle is yet to be developed, in order to facilitate the purchasing process for checkouts to be fast and accurate while optimizing delivery.

The developed solutions, in prior arts, were found to reduce delivery time, increase delivery success, and minimize contact between the courier and recipient; however, the purchasing process is disregarded and cash payments on delivery is unaccounted for, while the quality check aspects are limited, and user convenience is shortcoming which gives room for improvements.

Therefore, there is a need for an advanced smart parcel box system and method to optimize online purchases, minimize delivery time, enhance error correction, eliminate imprecision, and trust limitations. Such that, the purchasing process is reduced to few steps, the time wasted on halts and misdirected routes are eliminated, Errors in manual inputs are reduced with uninterrupted deliveries, while a successful unattended payment upon delivery is assured to improve the satisfaction of the customer, courier, and sender and enhance the effectiveness of utilizing a parcel box for accepting unattended online orders and attempting unattended payments upon delivery.

The terms 'purchase', 'order', 'parcel', 'delivery' or 'package' all relate to any type of delivery item or items, including, but not limited to, food delivery, boxes, bags, groceries, beverages, pharmaceuticals, laundry clothes, gifts, cosmetics, books, magazines, newspaper, letters, envelopes, or any other type of good that can be delivered.

SUMMARY

Systems and methods for the purchase and delivery process of online orders are disclosed. The disclose provides a smart parcel box system for time efficient deliveries, payment assurance, and evaluated quality by employing contactless pickup and delivery process with virtual cash on delivery and a quality check system that determines the quality of the package according to compared temperature and weight measurements. The smart parcel box further provides a unique identifying number (UID) for optimized online checkouts and deliveries, by eliminating errors in the manual checkout process of entering address instructions and the delivery process of travelling according to street signs and other routing technologies.

The present invention provides an adjustable smart Parcel Box (PB) to assist in the process of loading and unloading the receiving compartment of the parcel box, by mounting the smart parcel box on an adjustable portion configured to vary in height either manually, remotely, or automatically based on the users' height. Wherein the receiving compartment is secured by an access unit, which includes: a shutter door providing weather protection for a scanner, wherein the shutter door is configured to open automatically upon entering the digitally fenced region of the PB or by other_operating means described further in the detailed description; and a locking mechanism, configured to unlock based on matching an activated scanned identification code, to provide security. Wherein the identification code is activated upon entering the predetermined digital radius and only deactivates when leaving the digital radius, to provide countless access attempts when delivering while enhancing security, as the storage compartment will be inaccessible by the deactivated identification code. The system also includes a communication module to connect the smart parcel box to external devices, those include mobile phone(s) or other devices, and enable pairing of the smart parcel box to be in communication with neighboring parcel box(es) independently, to form a swarm of parcel boxes facilitating data transmission, error correction, and uninterrupted internet connections. Wherein the data transmitted include GPS coordinates from a GPS locator and the data received include the identification code of the order from the system, such that the delivery destination is reached upon following a direct route according to real-time GPS coordinates and the accurate PB is determined upon unlocking the locking mechanism according to matching the identification code received. The system also includes a laser projector and LED indicator to facilitate locating the intended PB from a distance, by projecting laser and LED lights upon package arrival by geofencing technology.

The smart parcel box of the present invention further facilitates precision in checkouts and delivery, by eliminating error-making in the manual checkout process of entering address instructions and the delivery process of travelling according to street signs or by other routing technologies, through configuring the smart parcel box with a unique identifying number (UID) that associates an address, GPS coordinates, contact information, medical data, etc. While integrating a checkout system that extracts data from the UID and transmits the extracted data to external device(s), which may be a mobile phone or other device(s). Wherein the medical data including allergies, pills, and medications of the user, may be compared with products purchased to send a warning to the user, if a product was found to be inadequate for the user, according to the medical data. The PB also provides a payment procedure facilitating unattended payments on delivery and payment assurance, through virtual cash on delivery (VCOD). The payment procedure holds payment transactions in the purchasing process upon checkout and only transfers the payment, to complete the transaction, upon securing the package in the receiving compartment of the PB.

System and method in accordance with the present invention provides a Product Quality Check system (PQC) to facilitate evaluation of delivery attempts, by comparing the weight, the temperature, or any other sensory measurements of the package after delivery with initial reference measurements. Wherein the initial measurements are taken in the point of package preparation and the comparison is made after securing the package in a receiving PB, in order to determine the quality, indicating the determined quality by activating an LED on the PB and to compile a record for data gathering, to be stored in the cloud. Such that the quality of the delivery can be evaluated, and the courier can be held responsible, if action is to be taken. While the sender, customer and the courier can be notified of the indicated quality, for proof. In an embodiment, the Product Quality Check (PQC) system may be employed as a standalone device for the initial measurements to be measured by any other device with sensory modules.

System and method in accordance with another embodiment of the present invention provides a smart locker system to facilitate time management in the pick-up process, from the point of preparation, by employing a plurality of PBs with geofencing technology. The locker system comprises a locking mechanism that is configured to activate based on a scanned identification code encoded with order specifications, and a communication module configured to transmit the code to be scanned. The PBL system also includes an LED indicator configured to operate based on geofenced technology, to guide a courier upon arrival and facilitate locating the PB intended to receive the delivery.

The present invention further includes a method of checking out by the PB checkout system for associating a delivery to a smart parcel box and implementing VCOD as a payment assurance. Wherein providing a UID and loading the PB with virtual cash is a requirement to complete the checkout.

Another method is provided for delivering a package to a smart parcel box by accepting delivery request, traveling based on data extracted from a UID, including GPS coordinates, and scanning an active identification code to complete VCOD payment transaction. such that, the delivery can be either accepted or rejected by digitally signing responsibility of the delivery and taking one route directly to the PB based on real-time GPS coordinates, while receiving an unattended payment upon delivery by unlocking the PB to secure the package.

This summary is not intended to limit the scope of the claimed subject matter or identify key features of the invention, but rather introduce the concept and embodiment in a simplified form, to be further described in detail with the accompanying drawings in the detailed description below.

DETAILED DESCRIPTION

In the following detailed description, the present invention with detailed embodiments and specific features are set forth to provide sufficient depth and detail, so that the disclosure is thorough and complete to fully convey the scope of the invention to those skilled in the art.

The present invention is described with reference to the accompanying drawings and figures. Embodiments of the present invention provide systems and methods for the management of online purchase and delivery.

Smart Parcel Box System

Figure 1:
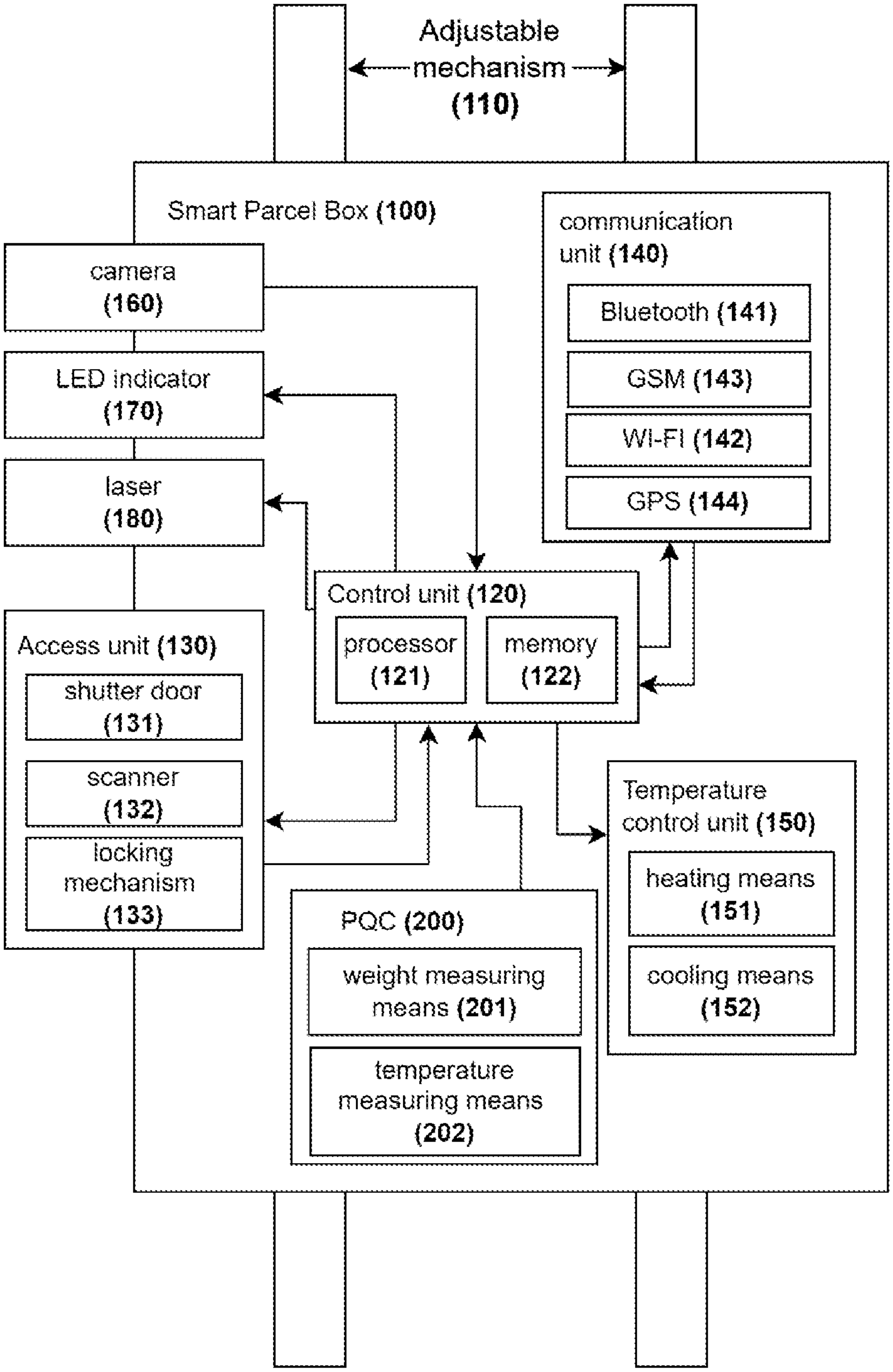
FIG. 1 is a block diagram of the smart parcel box system in accordance with an embodiment of the present invention.
Figure 2:
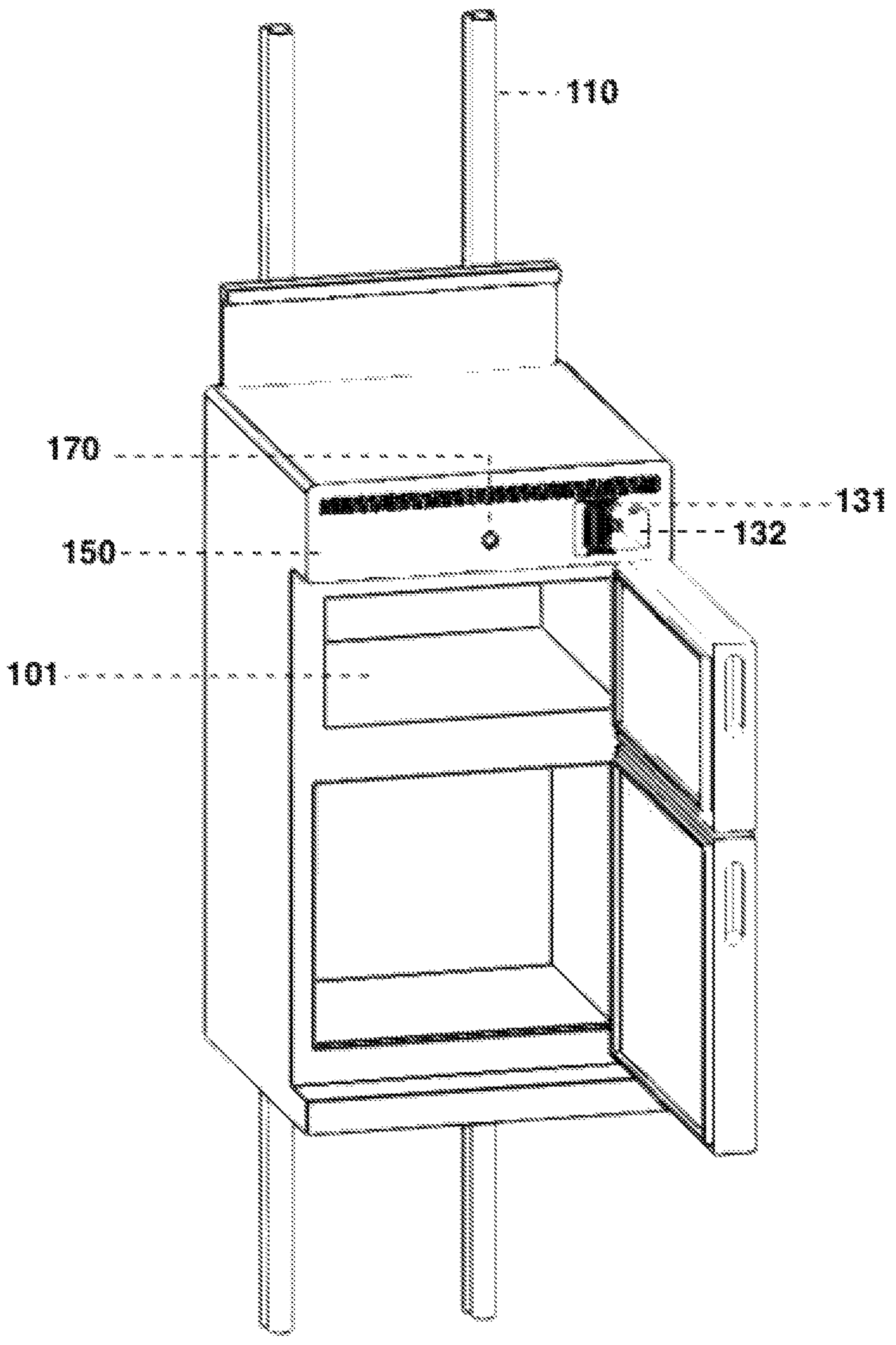
FIG. 2 Is a sketch of the smart parcel box system in accordance with an embodiment of the present invention.

FIG. 1 and FIG. 2 illustrate an embodiment of the Smart Parcel Box 100 for securing packages. The smart parcel box 100 is defined by a storage compartment 101 having an interior space suitable to secure different types of goods and provide hygienic conditions, wherein the goods may include packages, food, cosmetics, pharmaceuticals, or any other item of delivery. The smart parcel pox 100 comprises: a control circuit 120 configured to control the system 100; an access unit 130 configured to provide access to the storage compartment 101; a communication unit 140 configured to transmit and receive data wirelessly; a memory 122 configured to store data; a temperature control unit 150 configured to maintain storage conditions; a camera 160 configured to monitor and detect motion; an indicator 170 configured to flash LED(s); and a laser projector 160 configured to project laser.

The smart parcel box is employed with an adjustable portion 110, wherein the adjustable portion may include a rail mechanism or wall bearing. The adjustable portion 110 mounts the smart parcel box on a solid structure to drive the storage compartment 101 upwards or downwards, either automatically or remotely, to facilitate loading the storage compartment with ease and unloading the compartment in convenience. For example, a user with special needs (on a wheelchair) will require the PB to be low enough as when the physical ability to stand up is not possible, while another user with physical limitations will require the PB to be high enough when the physical ability to bow down is limited. So, the smart parcel box can descend or ascend on the solid structure based on the height of the user to assist the user in accessing the storage compartment.

The smart parcel box may be composed of a single storage compartment with temperature control means or multiple storage compartments each with temperature control means configured with different storage conditions to provide a suitable storage environment for each type of goods. For example, the type of good may require cool conditions such as pharmaceuticals and cold beverages, which can be secured in the compartment with storage conditions configured to maintain low temperatures. While other types of goods such as warm food, can be secured in the compartment with storage conditions configured to maintain high temperatures. Wherein the storage conditions are maintained and controlled by the temperature control unit 150 which includes heating means 151 and cooling means 152, that is connected to the processor 121 to operate before estimated time of delivery (ETA) to facilitate maintaining the quality of the unattended parcel delivery until time of retrieval. The storage compartment may include an occupancy sensor configured to detect if the storage compartment is empty to deactivate the temperature control unit 150 and detect if the storage compartment is occupied to monitor storage availability and the parcel.

Storage compartment 101 is secured by a door employed with the access unit 130. The access unit includes an automatic shutter door 131, a scanner 132, and a locking mechanism 133 which are connected to the processor 121 that is configured to operate the access unit 130, wherein the locking mechanism may include an electronic lock. The shutter door 131 secures the scanner 132 from above to provide protection against weather conditions and enables an additional access step, such that the storage compartment can be accessed based on two authentication signals. The first authentication signal is verified by the processor 121 to automatically activate the weatherproof shutter door 131 based on identifying an authorized user, while the second authentication signal is verified by the processor 121 to unlock the locking mechanism based on matching a scanned identification code. Wherein the identification code is activated upon entering the geofenced region to provide several access attempts to the storage compartment, and only deactivates upon leaving the radius of the geofenced region such that security is maximized, and the courier is not limited with one attempt to secure the parcel, considering possible human errors and interruptions. For example, the courier may accidentally lock the door after the first access attempt, before securing the parcel. Another example, the courier may secure the parcel and realize a piece was misplaced or forgotten. Thus, a second access attempt may be required to secure the order. The deactivation of the identification code also provides security as the storage compartment of the PB becomes inaccessible with a deactivated identification code, therefore the courier cannot access the storage compartment after the delivery. The identification code may further activate and deactivate upon every entry over a specific period of time, such that a subscription to a specific package delivery may be associated to the identification code with such configuration and the courier may periodically attempt the delivery based on the subscription without interruptions.

As of the first authentication, the identification of an authorized user is automatically verified by detecting the device ID of the users' external device based on geofencing technology. Wherein the device ID is detected upon entering the radius of the digitally fenced region and compared to the data stored in the memory 122, for the shutter door 131 to operate upon finding a match of an identical ID registered and stored in the database. As an alternative, the shutter door may operate by any other operational means, such as detecting motion near the PB by the camera 160, which includes an internal motion sensor, or manually sliding the shutters.

The communication unit 140 includes one or more communication modules to connect the smart parcel box with external device(s) for data transmission, wherein the communication modules may include GSM for utilizing the common mobile communication network including, but not limited to, 2G/3G/4G/5G, or wireless protocols including WI-FI, and Bluetooth, or any combination thereof, such that the transmission may be through cellular network or over certain frequencies. The data transmitted includes GPS coordinates from the GPS module 143 and the data received includes machine-readable codes encoded with the order specifications, to be stored in memory 122 temporarily. The communication unit 140 further connects the smart parcel boxes with each other independently to facilitate uninterrupted deliveries and internet connections, such that the data of a PB 100 with an internet connection failure may still be acquired to eliminate delivery delays and interruptions. For example, when the parcel box intended to receive a parcel requires maintenance, the neighboring PB may be utilized to operate the locking mechanism of the parcel box intended or accept the parcel instead of the PB intended. Also, the neighboring parcel box may pair with the intended PB to send GPS coordinates in case the intended PB was under maintenance. The neighboring PB may further act as a wireless access point and connect a PB, with a connection failure, to the internet.

The smart parcel box 100 further comprises an LED(s) 170 employed externally to flash unique patterns of lights, in addition to a laser projector 180 configured to project laser on any surface. Wherein the LED and laser projector are configured to activate upon detecting a registered device ID entering the geofenced region of the PB, to facilitate locating the intended parcel from a distance, and to deactivate upon unlocking the PB.

The system in accordance with the present invention includes an internal source to supply the hardware components with power, wherein the built-in power supply may be charged by an external power source. Some embodiments may include additional sensing means to monitor the power supply and access unit of the PB while facilitating security and power saving features. The PB may include a camera 160 with a motion sensor and a power sensing means, such that user activity can be recorded by detecting motion near the PB. While power consumption can be reduced by deactivating the PB under certain conditions, such that the PB may be fully or partially set to a dormant state when no activity is being detected for a predetermined time. The PB may further include a power sensing means to detect power failures, wherein a warning of a power failure can be transmitted to the admin for maintenance.

The smart parcel box in accordance with the embodiments may be arranged in various orientations and may take any form, size, or color. The system may further comprise one or more means to facilitate the safety and security of the PB, including, but not limited to, an alarm means, vibration sensor, proximity sensor, resistance sensor, and/or tamper sensors.

Checkout System

An embodiment of the invention integrates the smart parcel box 100 with an e-commerce checkout system to facilitate a semi-automated checkout and precise delivery. The system is configured with a unique identifying digit (UID), such that a single line of code associates the PB with specific user data, including a home address, phone number, medical data, delivery instructions, VCOD data and GPS coordinates. Wherein, the UID is utilized as the delivery address for the accurate and precise data to be extracted automatically from the UID upon checkout by filing all checkout fields in the interconnected online platforms, to deliver based on real-time GPS coordinates. The UID may be configured with both constant values and varying values to associate multiple UIDs with the same parcel box, for multiple users. For example, a smart parcel box is registered for a household with 3 family members, the UID may be composed of the following constant values '12345' along with a varying value for each member as follows '12345A', '12345B', and '12345C'.

In an embodiment, the medical data may include user allergies, pills, and medications to be compared with products purchased. The comparison facilitates determining inadequate products for the user based on the medical data, for if a product included in the purchase was found to contain inadequate ingredients or components, a warning is sent. For example, a user with nut allergies may purchase a dessert without knowing nuts is a main ingredient, the system would compare the ingredients of the dessert with the user allergies to send a warning, if a match was found.

The checkout system further facilitates unattended payment upon delivery and payment assurance by employing Virtual Cash on Delivery (VCOD). Wherein the VCOD is a debit loaded to the PB to have a virtual balance that is only used as a payment assurance before the delivery attempt and can only be unloaded to complete a payment upon the delivery attempt. The checkout system is configured to hold the VCOD payment transaction, until the parcel is delivered to the PB, and completes the payment transaction upon scanning the identification code of the parcel, using the scanner 132, to unlock the PB.

The system in accordance with the present embodiment further provides an approval for receiving the delivery. Wherein the PB stores the clients' signature in the memory 122 to transmit the digital approval upon scanning and unlocking the storage compartment 101 to secure a parcel in the smart parcel box system 100.

Quality Check System

The system, in accordance with the embodiments, employs a Product Quality Check (PQC) system 200 to facilitate delivered parcel quality evaluation based on at least 2 factors. The system employing PQC 201 comprises sensing means to measure the initial and final weight of the package in addition to the initial and final temperature. Wherein the initial weight and temperature are measured in a supplier parcel box, in the parcel preparation origin such as a warehouse or restaurant, while the final weight and temperature of the package are measured in a receiving parcel box, in the delivery origin such as a resident. Wherein the weight measuring means 201 may include weight scale, load cells or any other weight measuring means. while the temperature measuring means 202 may include wireless max temperature sensor, thermal camera, or any other temperature measuring means.

The system is connected to a processor configured to compare measurements and determine the quality based on comparison, wherein a threshold value is set based on the reference initial measurements, to indicate an inferior, fair, or good quality. Wherein the PQC system is configured to indicate a good quality if the final measurements were found to exceed the preset value, while a fair quality is indicated if the measurements were found approximately equivalent to the pre-set value, and an inferior quality is indicated if measurements were less than the preset threshold. Wherein the one or more LEDs are configured to indicate the determined quality of the delivery by lighting up an indicative color representing a good, fair, or inferior quality. For example, the parcel to be delivered my initially measure 30° C. and 10 kg in a supplier parcel box before the delivery attempt, the PQC system may set a threshold value according to the initial measurement (30° C. & 10 kg) to be 25° C. and 8 kg. For if the final measurements were determined in the PB, less than 5° C. and 2 kg of the initial measurement (<25° C. & <8 kg), or equivalent to 5° C. less than the initial measurement (=25° C. & =8 kg), or greater than 5° C. of the initial measurement (>25° & >8 kg), the quality may be indicated as inferior, fair, or good accordingly.

The PQC system may further employ sensing means and/or artificial intelligence (AI) technologies, such that the evaluation of the parcel quality may be more precise based on multiple factors. Wherein the AI technology may include an AI camera detecting breakage, missing elements, scratches, stains, and/or other damages.

In another embodiment, the PQC system is employed externally as a standalone device for parcel delivery evaluation, wherein the device comprises a receiving table with weight and temperature measuring means, a scanner configured to read a generated identification code to associate the order with measurements taken and a communication module configured to send the measured data, as a reference, to the PB intended to receive the parcel. The weight measuring means may include weight scale, load cells or any other weight measuring means, while the temperature measuring means may include wireless max temperature sensor, thermal camera or any other temperature measuring means.

Parcel Box Locker System

Figure 3:
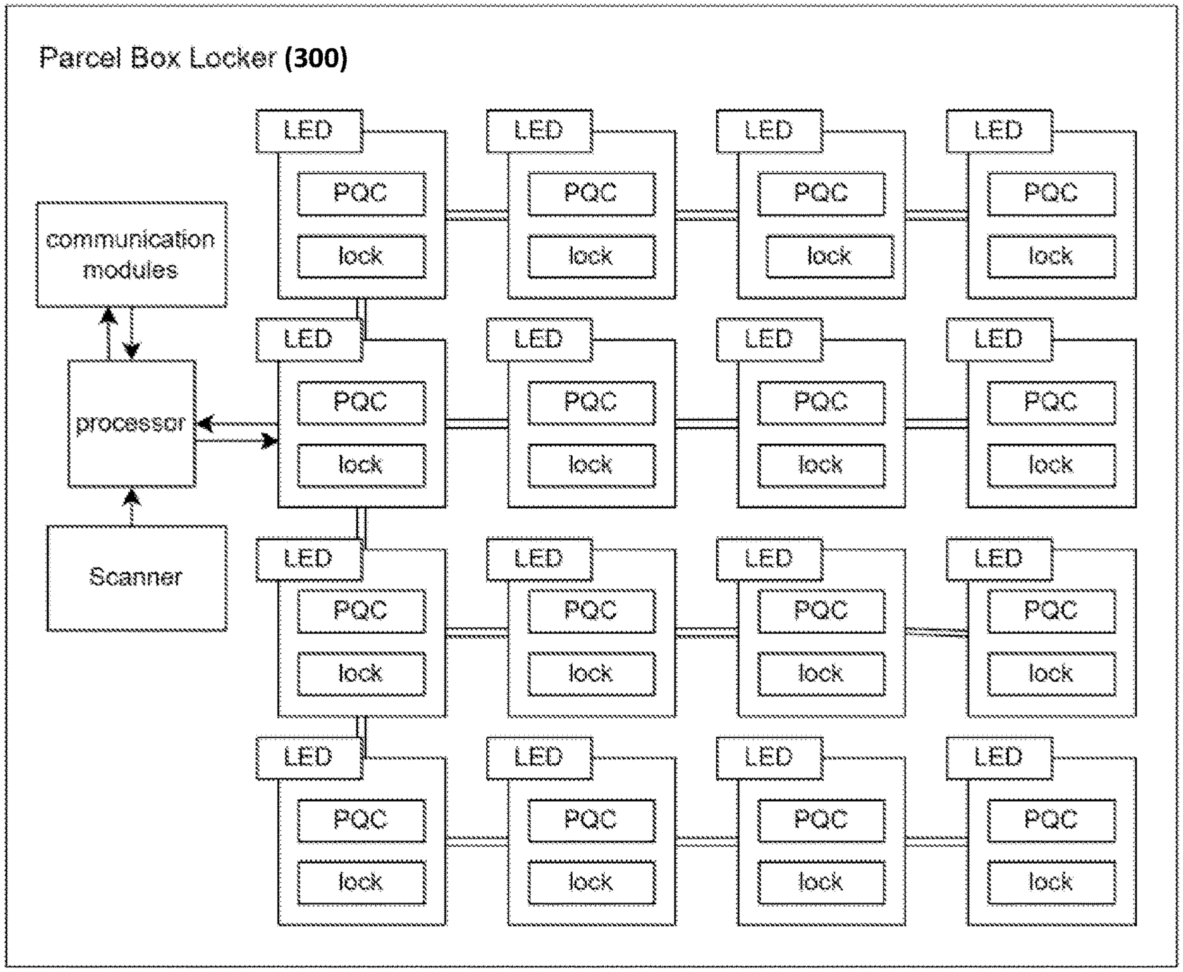
FIG. 3 Is a block diagram of the smart parcel box locker system in accordance with an embodiment of the present invention.

As illustrated in FIG. 3, an embodiment of the Parcel Box Locker (PBL) system for securing packages is disclosed. The locker system 300 provides a plurality of supplier parcel boxes 100 mounted on a structure of the place of preparation, such as a warehouse or restaurant, for temporarily storing the parcel to be delivered after preparation. The arrangement of the storage compartment may be in different orientations to facilitate the pick-up process. For example, the storage compartments may be organized in columns, by configuring each column to associate parcels to the storage compartments based on addresses for securing parcels travelling to the same regional area in the same column.

In another embodiment, the PBL unit 300 is integrated within the wall to have two access doors. A front door giving access to the storage compartment from inside the building, and a rear door giving access to the storage compartment from outside the building. For example, the PBL may be integrated to a restaurant wall, wherein the front door gives access to the restaurant kitchen for the food to be prepared and secured inside the storage compartment, while the rear door gives access from outside the restaurant building, for the courier to drive up to the PBL and collect the secured parcel.

The system in accordance with the embodiment employs the PQC system 200, to take and send initial measurements of the parcel, with geofencing technology to facilitate finding the nearest carrier for pickup. The system comprises a control unit, communication modules, locking mechanism, scanner, LEDs, and PQC system. The control unit, including a controller, is in electrical communication with the components, configured to operate the locking mechanism, and process data from the scanner and PQC system. The controller is also in electrical communication with LED(s) configured to activate an LED corresponding to a storage compartment upon detecting a registered device ID entering the geofenced region of the locker unit and deactivate upon unlocking the PB, to facilitate locating the storage compartment securing the package intended for pickup. Wherein the locking mechanism is unlocked, by the controller, upon processing the scanned data and locked automatically upon closing the door, for the PBL to secure the parcel and the PQC to measure initial weight and temperature measurements. Wherein the controller is further configured to send the data through the communication module to be stored in the cloud and resets the measurements of the PQC when the door of the PBL is reopened.

Figure 4:
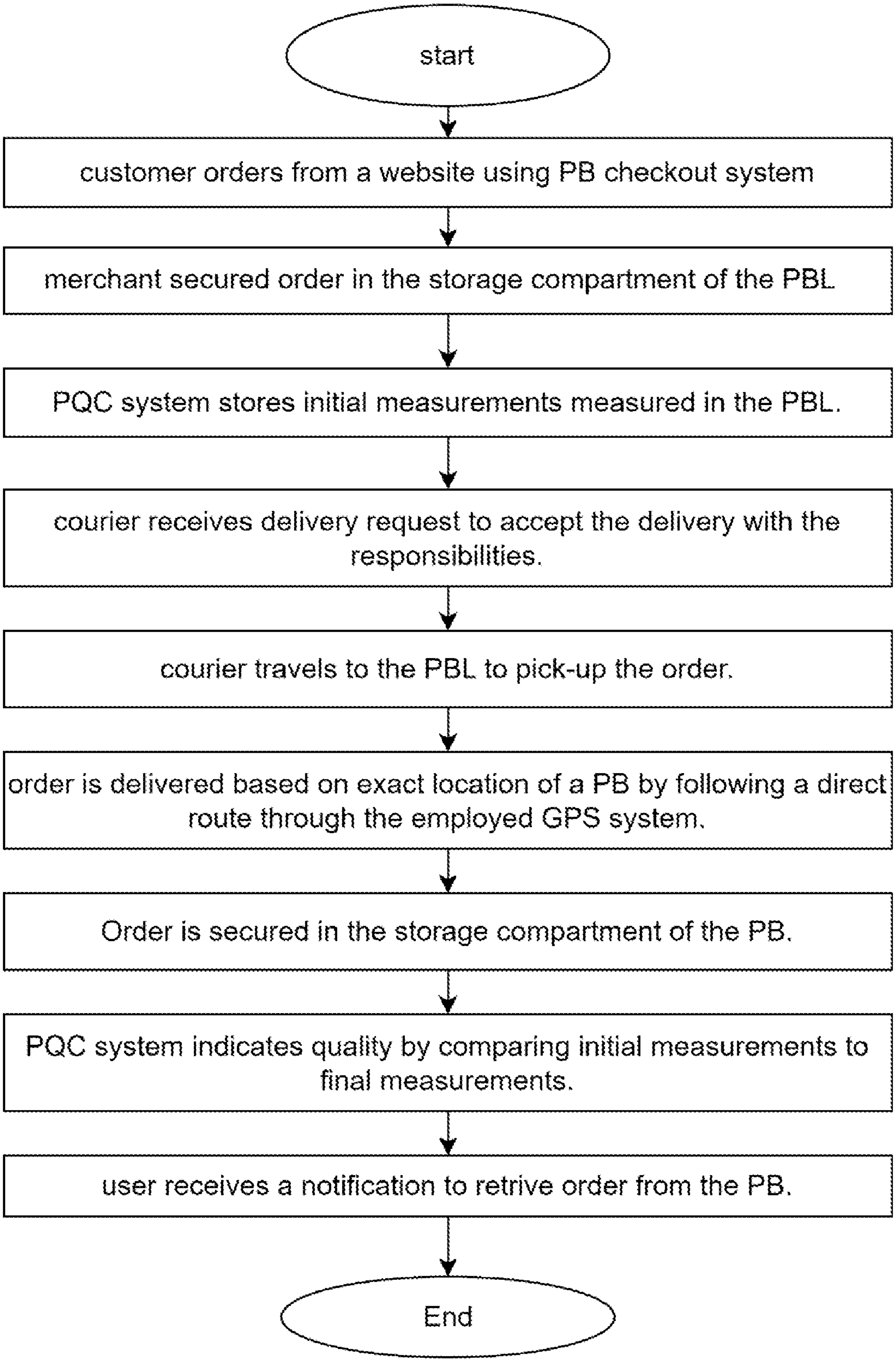
FIG. 4 is a flowchart of the overall process of utilizing the PB checkout and delivery system.

A general overview of the purchasing and delivery process using the smart parcel box systems and methods in accordance with the embodiments is depicted in FIG. 4. The detailed processes are illustrated in FIGS. 5-11, depicting the steps for utilizing: the PB checkout system to purchase; the PQC system to determine quality; the PBL to optimize pick-up; and the PB system to deliver, pay, and retrieve unattended parcel deliveries.

Operation of the Checkout System

Figure 5:
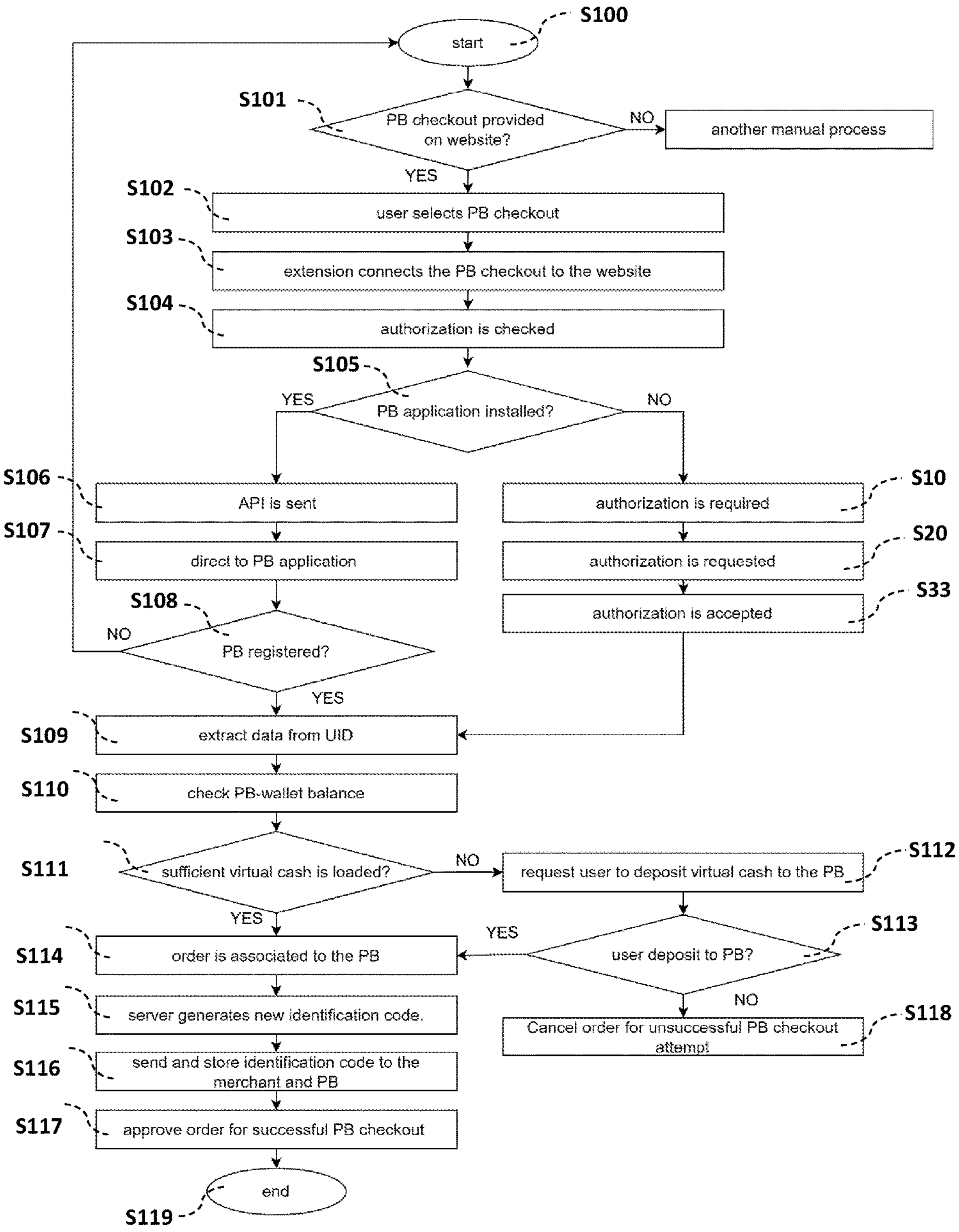
FIG. 5 is a flowchart that illustrates the process of purchasing by the PB checkout system to have the delivery associated to the PB.

The checkout operation for purchasing an item from an e-commerce site using the PB checkout system, is depicted in FIG. 5. Initially, the customer is required to place an order using an e-commerce site employed with the PB checkout system S101. In case the checkout system is provided on the website and selected by the user S102, an extension is called S103, wherein the extension connects the system of the website to the PB system. The PB system then checks authorization S104 by finding if the PB application is installed on the device S105, or otherwise. If the application was not found on the device, then the user is not authorized to utilize the PB without verification. However, If the application was installed, an Application Programming Interface (API) is called S106 to connect the PB system and extract data through the app directly S107. The PB registration is then checked S108, for the system to extract the UID automatically S109 and associate the order to the PB corresponding to the extracted UID, when finding registration. The system then requires securing a payment, to have virtual cash on hold, before associating the order to complete the checkout process, by checking the PB-wallet S110. If the PB-wallet was not loaded with virtual cash, the user is requested to deposit to the PB S112. After loading the PB with virtual cash, as requested, the order is associated S114, and an identification code is generated S115. The identification code generated is encoded with the order specification and sent to be stored in the cloud and in the memory of the associated PB S116. Once the identification code is sent, the checkout is complete successfully S117. The system is only programmed to complete the checkout successfully S117, when the UID is extracted, the PB-wallet is loaded, and the Identification code is generated and sent. Otherwise, the checkout is unsuccessful, and the order is cancelled S118. In another embodiment, the checkout may still be completed successfully without loading the PB-wallet with virtual cash.

When the checkout system is not provided on the website and cannot be selected by the user, another manual process may be implemented, such that the order can still be delivered to the PB. The manual process may require a tracking number as an input, once a tracking number is generated by the shipping company, after completing a purchase. Wherein the user may copy the tracking number, then opens the PB application and selects the shipping company delivering the parcel to input the tracking number and associate the delivery to the PB.

In yet another case, verification is required for unauthorized users to utilize the PB S10. The verification can be granted by the owner in more than one way such that the unauthorized has the option of entering the phone number of the owner or a unique PB number to send a request S20, and for the user to accept S33.

Figure 6:
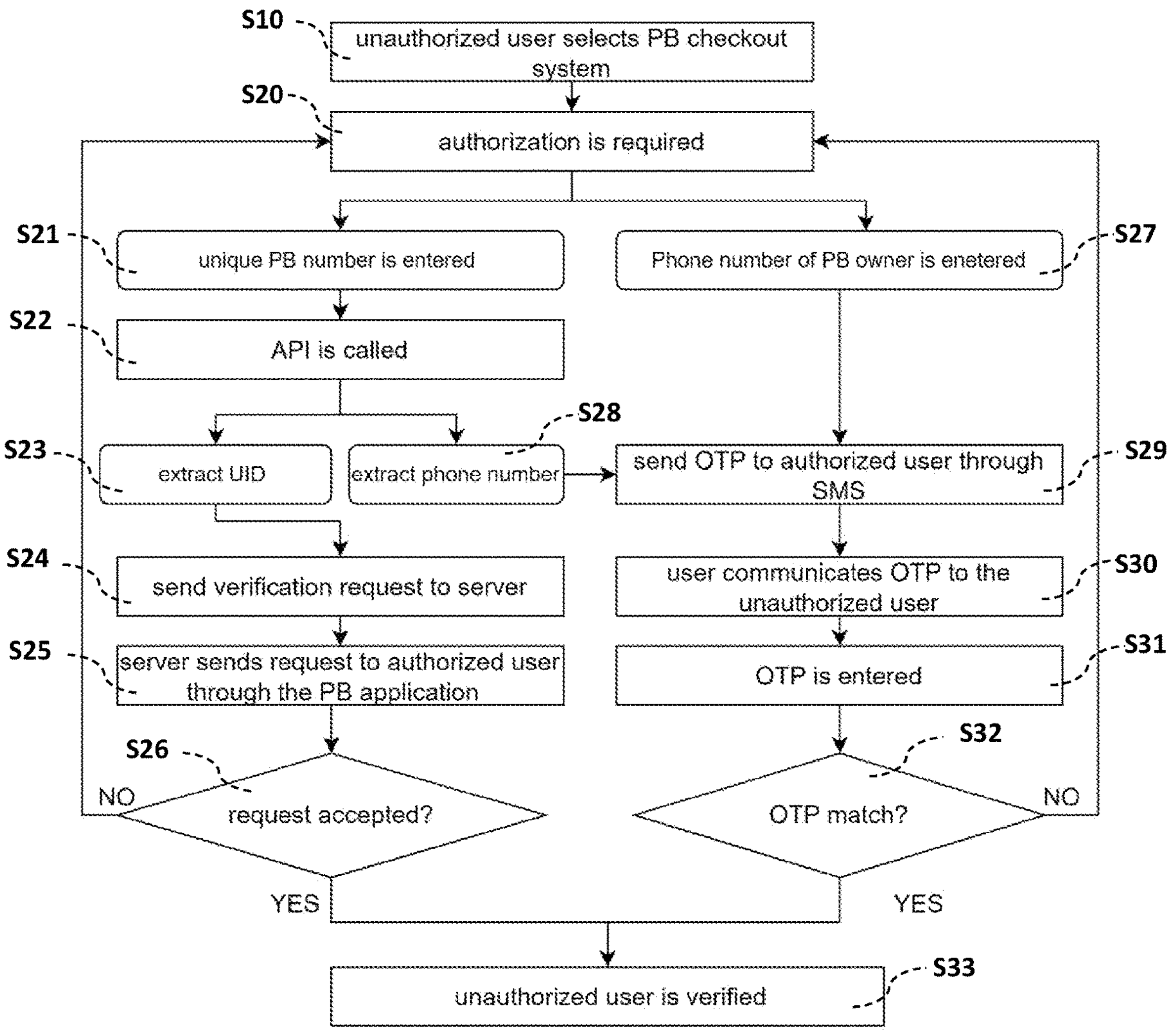
FIG. 6 is a flowchart of different verification methods.

The process in which the unauthorized user request for verification S20 is depicted in FIG. 6. wherein the verification can be granted by the owner in more than one way. The verification may be sent to the owner from the application as one way, while a one-time passcode (OTP) may be sent to the owner by short term messages (SMS), as another way. The unauthorized user may input a unique PB number S21 for an API to be called S22 and the UID associated with the unique number to be extracted S23. Once the UID is extracted, a verification request is sent to the server S24, and the owner receives the request through the application S25. Only by accepting the verification request S26, the unauthorized user is verified S33, and the process proceeds to successfully complete the checkout, as described previously by steps S109-S119. Alternatively, the unauthorized user may input a unique PB number S21 or the phone number of the PB owner S27, to request for an OTP. If the user enters a unique number S21, an API is called S22 to extract the phone number of the user from the database S28. Otherwise, if the phone number is entered S27, the extraction step S28 is skipped. In both cases, the system sends a generated OTP to the phone number S29 through SMS. Once the OTP is received, the owner may communicate the OTP S30 to the unauthorized user, for the user to input the OTP S31 and the system to verify upon finding a match S32. Once a match is found, the unauthorized user is verified S33 and the process proceeds to successfully complete the checkout, as described previously by steps S109-S119. Once any of the verification methods is approved, the order is associated with the PB and the checkout is complete.

Operation of the Product Quality Check System

Figure 7:
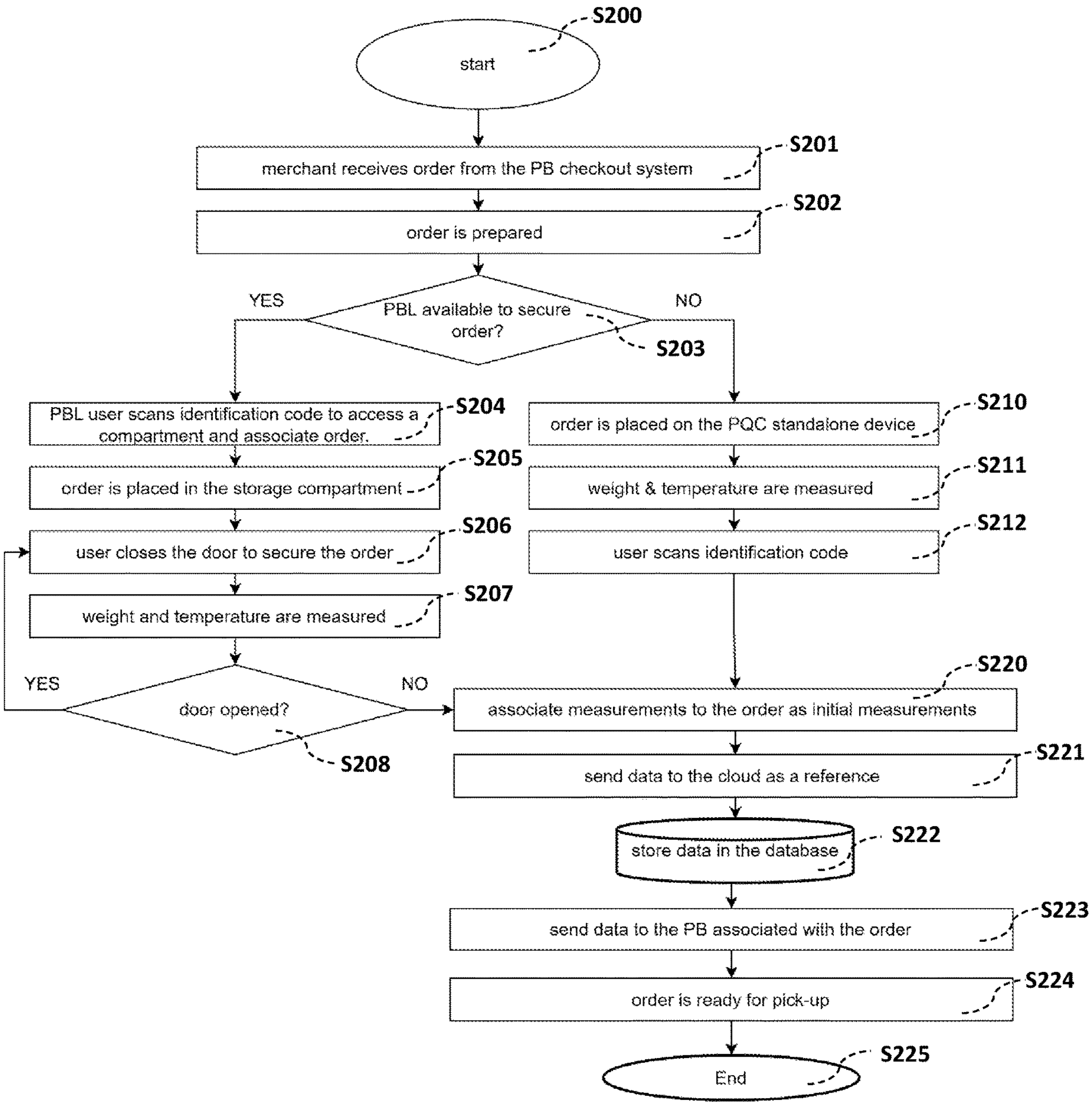
FIG. 7 is a flowchart of a process in which the PBL is utilized by a sender.

A method for utilizing the PQC system, to permit quality evaluation of a delivered package, is depicted in FIG. 7. In one operation, the warehouse/restaurant is provided with the locker system PBL 300 comprising a plurality of compartments. When the sender receives an order S201, the parcel is secured inside one of the compartments in the PBL 300, after step S202 of preparing the order. Wherein the order is associated to the compartment upon scanning the identification code, to unlock the door S204 for the order to be placed in the compartment S205. Once the order is placed, the door may be then closed S206 for the PQC system to take measurements of the weight and temperature S207. Wherein the door of the storage compartment is monitored, for if the door was reopened S208, the measurements are reset for the weight and temperature to be measured S207 every time the door is locked, and the parcel is detected inside. After the PQC operation, the system then associates the measurements to the order S220 and sends the data, as a reference, to the cloud S221 to be stored in the database S222 and to the PB intended to receive the order S223 to be stored in the memory temporarily.

Alternatively, in another operation, the warehouse/restaurant is not provided with a locker system PBL. Thus, the PQC device is utilized to take the initial measurements and associate data to the order. Wherein the parcel is placed on the PQC standalone device S210, once the order is prepared, for the measurement of the weight and temperature to be taken S211. Once the measurements are taken, the user may scan the identification code of the order S212 to associate the measurements. Once the measurements are associated, the data is sent to the cloud S221 and to the PB S222 intended to take the final measurements. When the reference data is successfully sent the parcel becomes ready for pickup S224.

Method of Delivery to the Smart Parcel Box

Figure 8:
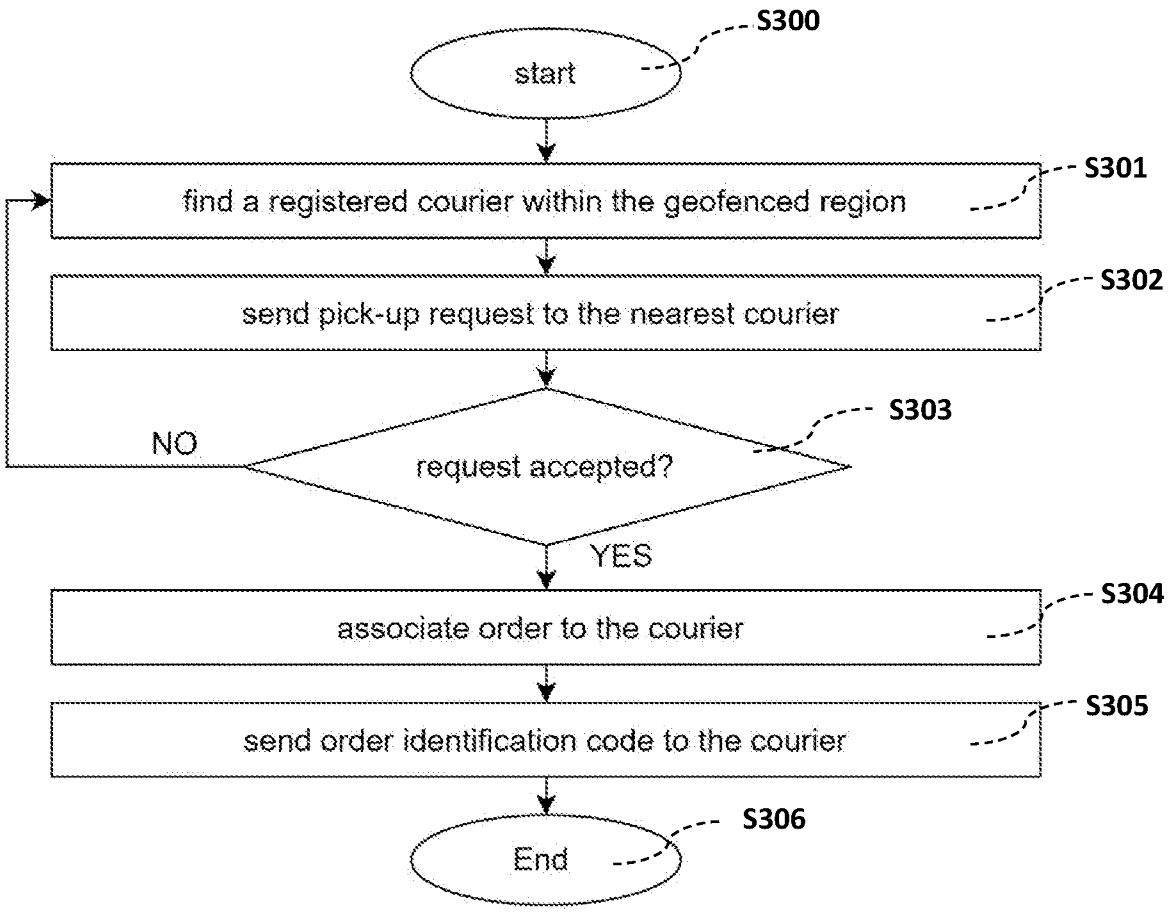
FIG. 8 is a flowchart of a process in which the courier is associated to a delivery.

The process in which the courier is associated to a delivery to retrieve an order from the PBL system is depicted in FIG. 8. The PBL system is configured to find registered couriers device IDs by the employed geofence technology S301, wherein the block region of the warehouse/restaurant is digitally fenced to facilitate sending pickup requests to the nearest couriers. Once the request is received, the courier may accept or reject making the delivery from the request S303. If the courier rejects the request, the system finds another registered courier within the geofenced region S301. However, if the courier accepts the request, the responsibility for a safe and secure delivery is digitally signed and the order is associated to the courier accepting the request S304. Once the order is associated, the courier then receives a soft copy of an identification code from the application, which is encoded with the order specifications S305. Wherein the identification code received, acts as an access key to the storage compartment corresponding to the associated order in the locker system, for the courier to pick up the order from the PBL.

Figure 9:
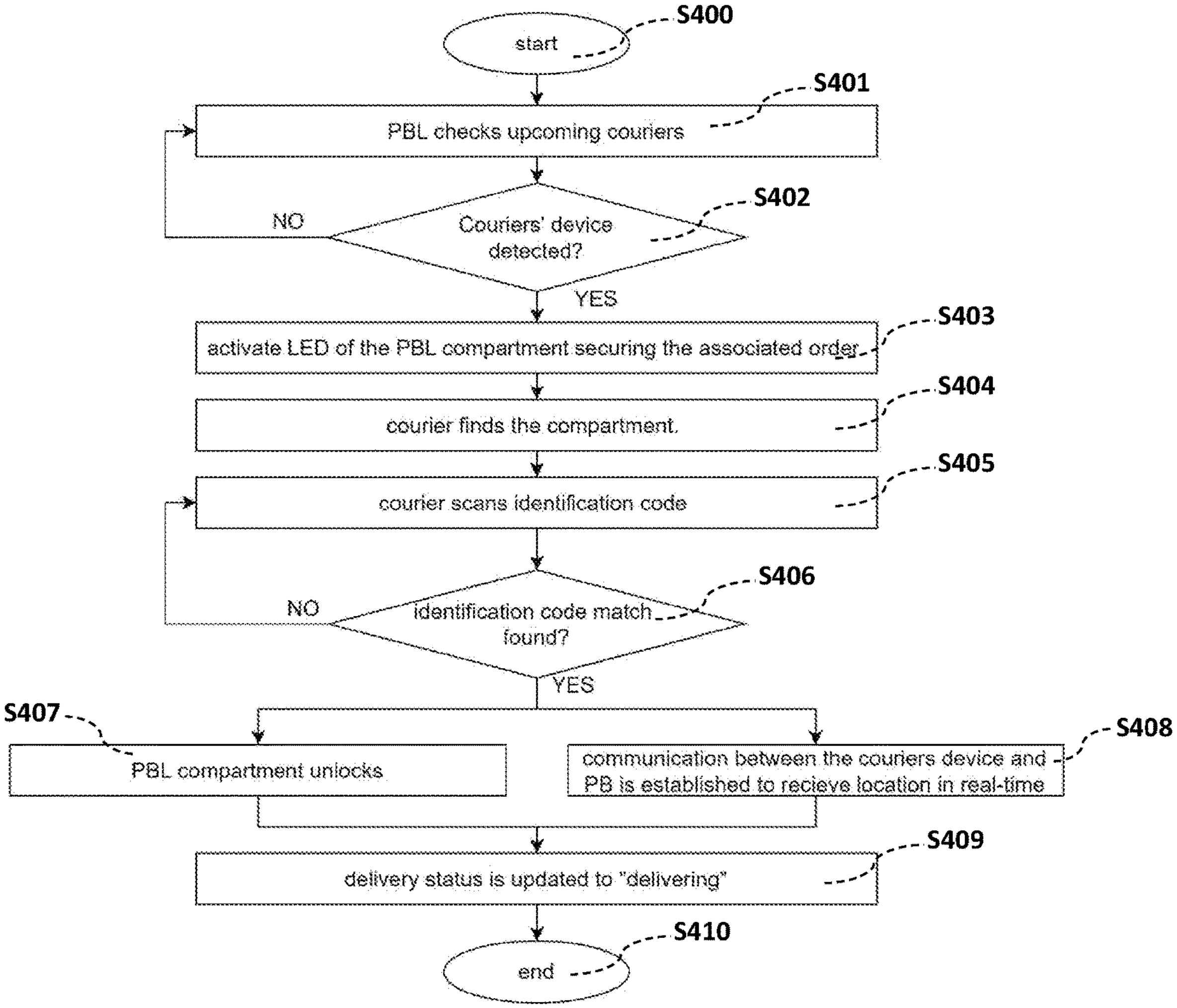
FIG. 9 is a flowchart of a process in which the order is collected from the PBL by a registered courier.

The process in which the order is picked up from the PBL by a registered courier is illustrated by FIG. 9. The PBL system employing geofence technology, checks the upcoming couriers constantly S401 and detects couriers' devices S402 upon arrival. Once a device of an associated courier is detected, an LED corresponding to a storage compartment is activated S403, wherein the LED indicates the storage compartment associated with the order. The courier may then easily locate the storage compartment S404 in the PBL system, to retrieve the order by passing the identification code through the scanner S405. The system then compares the identification code to find a match S406. Upon finding a match, the storage compartment is unlocked S407, and a communication is established S408, wherein the communication connects the couriers' device and the PB intended to receive the order. Once the connection is established, the courier receives the location of the PB and delivery instructions to deliver the parcel based on the exact location of a direct route by the GPS coordinates and user instructions. The exact location is received in real-time by linking the couriers' device to the PB through the established communication between the external device and the GPS locator of the PB. Simultaneously, upon collecting the order, an update of the delivery status being on the way is sent to the user S409.

Figure 10:
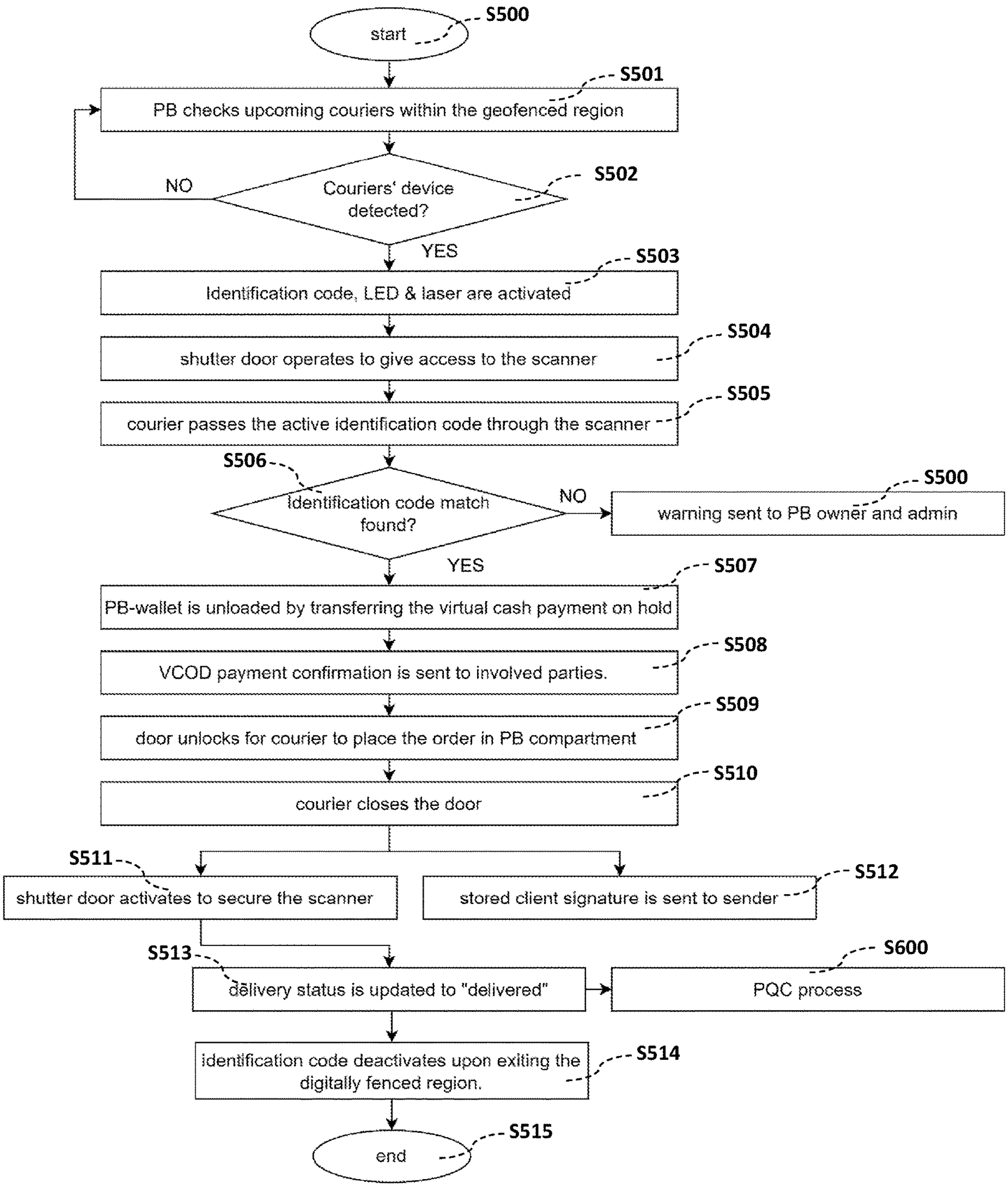
FIG. 10 is a flowchart of a process in which the order is delivered to the PB.
Figure 11:
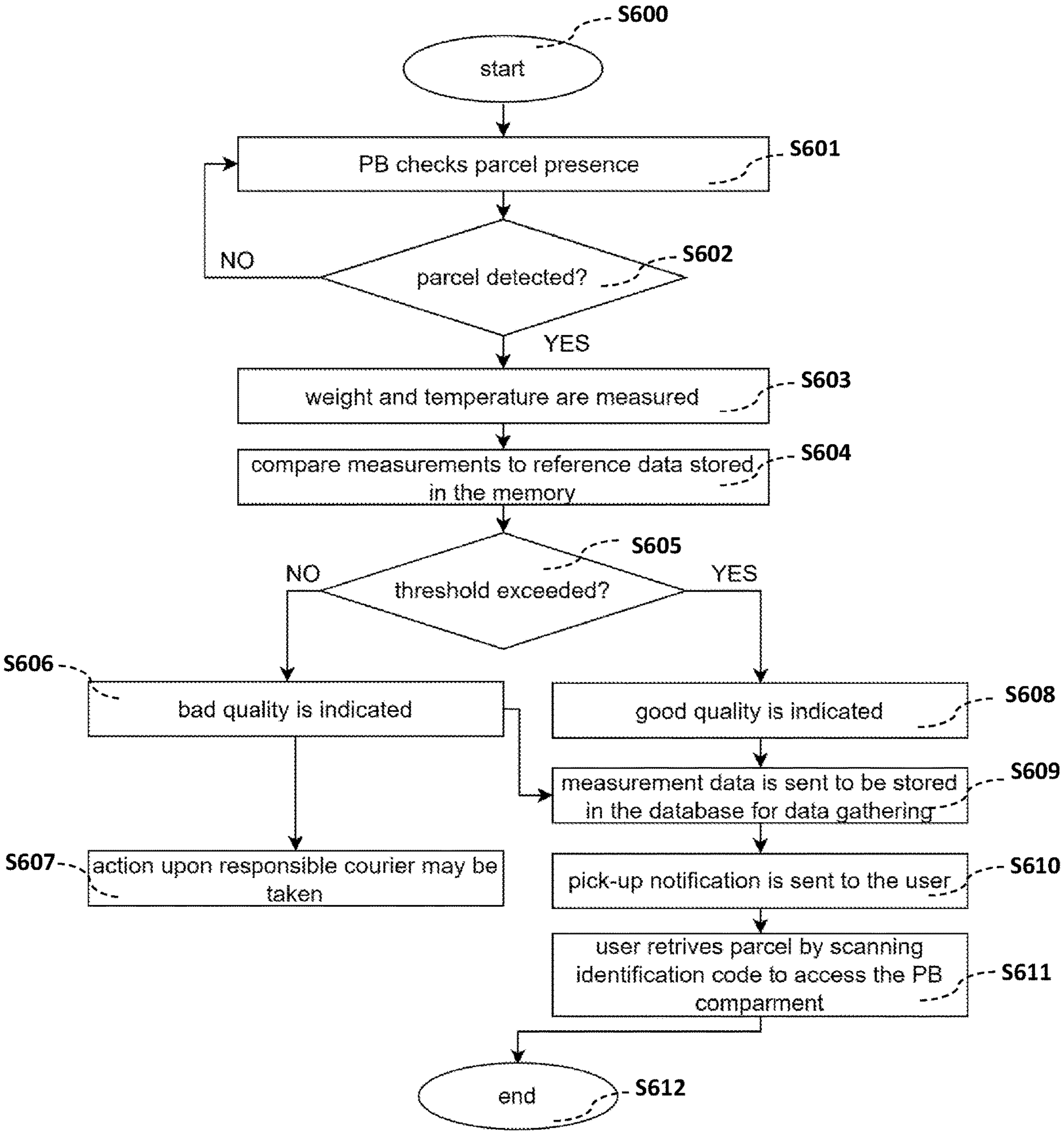
FIG. 11 is a flowchart of a process of indicating the quality by the PQC system after securing the order in the PB.
Figure 12:
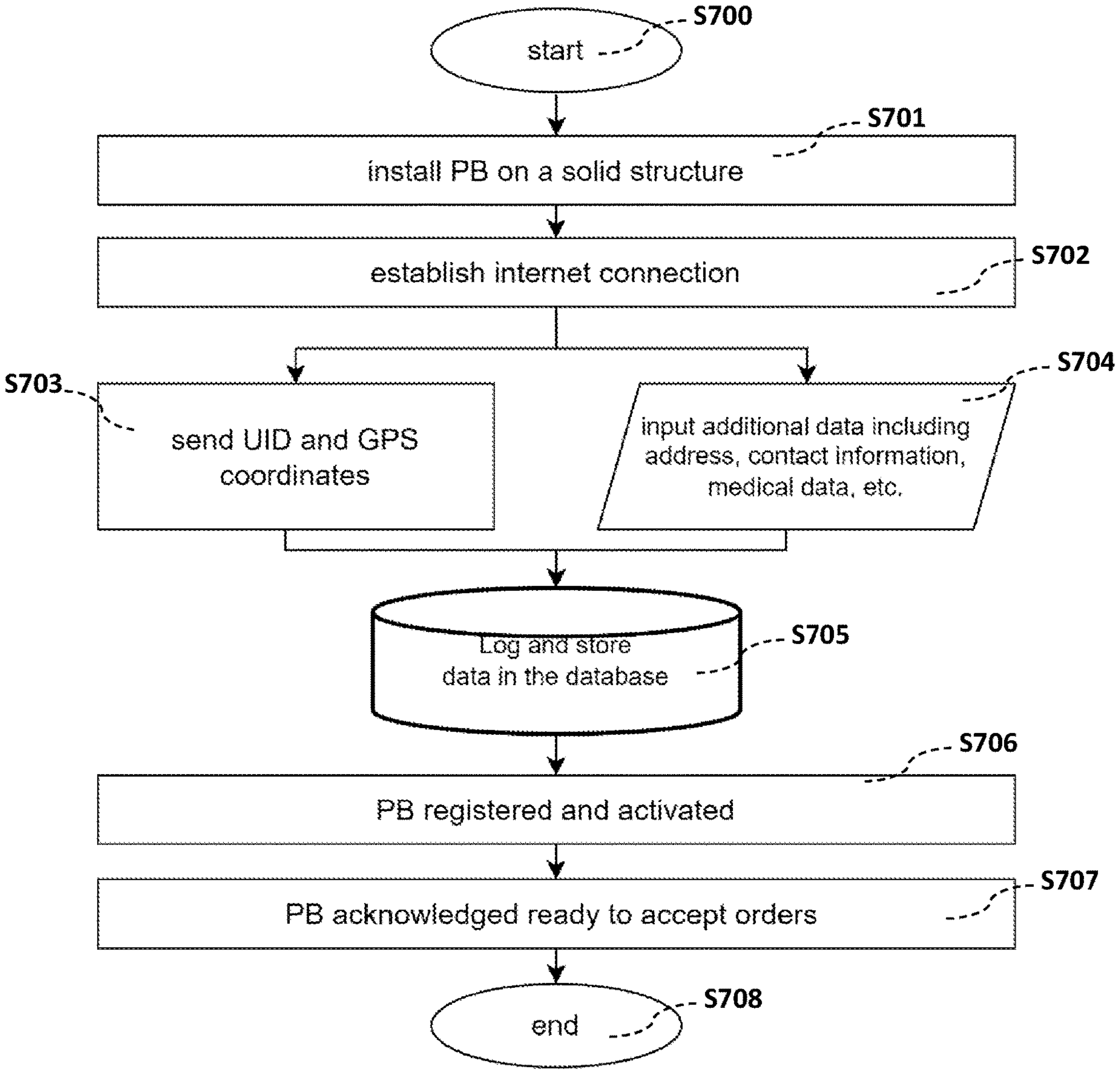
FIG. 12 is a flowchart of a process in which the parcel box is installed and set up.

Subsequently, the process in which the order is delivered and secured by the PB is depicted in FIG. 10 and FIG. 11. The PB employing geofence technology, checks upcoming couriers S501 and detects couriers' devices IDs S502 upon arrival. wherein the block region of the PB is digitally fenced to facilitate finding and accessing the intended PB. Once a device of an associated courier is detected within the geofenced region, the identification code, LED indicator, and laser projector are activated S503. wherein the LED is configured to flash unique patterns of light and the laser projector operates to project laser beans on the floor to facilitate finding the PB from a distance by the upcoming courier. Meanwhile, the shutter door of the scanner is configured to open automatically S504. Once the PB is found, the courier may then scan the activated identification code from the external device S505 from which the code was received. Wherein the identification code may provide several access attempts to the storage compartment once activated, and only deactivates upon leaving the radius of the geofenced region, such that the courier is not limited with one attempt to secure the parcel without forgetting or mistakenly locking the door.

Once the courier scans, the PB compares the identification code with the stored data from the database, to find a match S506 of an identical identification code stored in the memory. If a match was not found, a warning is sent to the user and admin(s) indicating a failure in an access attempt, wherein the admin may then operate the PB remotely after identifying the user. Otherwise, if a match was found, the system implements the VCOD operation by transferring the virtual cash payment on hold to the sender S507. A notification is then sent S508, notifying the user and courier

The invention claimed is:

1. A smart parcel box system characterized by an advanced checkout system interconnected with e-commerce and online platforms to facilitate a semi-automated checkout and precise delivery, comprising:

a unique ID (UID) assigned to a smart parcel box, configured to associate the smart parcel box with specified data, wherein the data associated to the UID is extracted automatically and sent upon checkout to an interconnected e-commerce and/or online platform to automatically load checkout fields. the data comprises an address line and contact information.

2. The system of claim 1, further comprises virtual cash on delivery (VCOD) payment mechanism, wherein the VCOD payment mechanism is configured to receive deposit payment in a virtual Parcel Box wallet (PB-wallet) associated with the smart parcel box system and holds payment amount in pending processing state, such that payments are released and transferred only upon delivery confirmation acknowledgment from the smart parcel box system triggered by a match of identification code.

3. The system of claim 1, further comprises a method of a smart parcel box installation, the method comprising the steps of:

automatically registering a smart parcel box to cloud upon installing the smart parcel box on a solid structure;

automatically associating the smart parcel box to a unique ID and GPS coordinates; and inputting user data, wherein the data includes contact information, an address, and additional delivery instructions.

4. A method of checking out by an advanced checkout system interconnected with e-commerce and online platforms, comprising:

selecting a smart parcel box checkout system;

loading a smart parcel box with virtual cash;

entering a unique ID associated to smart parcel box as a delivery address; and automatically filling checkout fields of interconnected e-commerce and online platforms with data extracted from the unique ID.

5. The method of claim 4, wherein the data extracted from the unique ID includes an address line, contact information, and delivery instructions.

6. The method of any of claim 4 or 5, wherein a delivery is made based on the extracted data filled automatically by the unique ID.

7. The method of claim 4, wherein an authorization is required for unauthorized users to use the smart parcel box unique ID, wherein authorized users may allow or deny access.

8. The method of any of claim 4 or 5, wherein the authorization is a one-time passcode, or a verification request sent to a smart parcel box admin.

* * * * *